(12) United States Patent
Hyun

(10) Patent No.: US 7,938,354 B2
(45) Date of Patent: May 10, 2011

(54) CLUTCH OF BAIT REEL FOR FISHING

(75) Inventor: Kwang-Ho Hyun, Bucheon (KR)

(73) Assignee: Doyo Engineering Co., Ltd. (KR)

( * ) Notice: Subject to any disclaimer, the term of this patent is extended or adjusted under 35 U.S.C. 154(b) by 0 days.

(21) Appl. No.: 12/821,678

(22) Filed: Jun. 23, 2010

(65) Prior Publication Data
US 2010/0327098 A1 Dec. 30, 2010

(30) Foreign Application Priority Data

Jun. 26, 2009 (KR) .................. 10-2009-0057446

(51) Int. Cl.
*A01K 89/01* (2006.01)
(52) U.S. Cl. ................... 242/301; 242/257; 74/577 R
(58) Field of Classification Search ........... 242/301, 242/256, 257, 259, 263; 254/217, 223, 247, 254/306, 320; 192/46, 107 M, 107 T; 81/60–63.2; 188/82.7, 82.77; 74/577
See application file for complete search history.

(56) References Cited

U.S. PATENT DOCUMENTS

| | | | | |
|---|---|---|---|---|
| 1,299,959 A | * | 4/1919 | Keyser ........................ | 242/294 |
| 1,379,692 A | * | 5/1921 | Pflueger ..................... | 242/294 |
| 2,535,584 A | * | 12/1950 | Lorenz ........................ | 242/292 |
| 2,573,074 A | * | 10/1951 | Von Pein .................... | 242/260 |
| 2,711,865 A | * | 6/1955 | Ruterbories ................ | 242/226 |
| 3,467,336 A | * | 9/1969 | Appleton .................... | 242/291 |
| 3,478,976 A | * | 11/1969 | Sarah .......................... | 242/270 |
| 3,574,339 A | * | 4/1971 | Sarah .......................... | 242/295 |
| 4,163,528 A | * | 8/1979 | Egasaki et al. ............. | 242/300 |
| 4,505,167 A | * | 3/1985 | Nicolaus ..................... | 74/577 R |
| 4,899,953 A | * | 2/1990 | Toda ........................... | 242/268 |
| 5,037,039 A | * | 8/1991 | Toda ........................... | 242/223 |
| 5,108,041 A | * | 4/1992 | Toda ........................... | 242/223 |
| 5,125,593 A | * | 6/1992 | Toda ........................... | 242/268 |
| 5,285,982 A | * | 2/1994 | Kopetzky ..................... | 242/372 |
| 5,615,840 A | * | 4/1997 | Bushnell et al. ............ | 242/301 |
| 5,806,776 A | * | 9/1998 | Anderson .................... | 242/292 |
| 5,855,263 A | * | 1/1999 | Fergle ......................... | 192/46 |
| 6,431,482 B1 | * | 8/2002 | Ikuta ........................... | 242/297 |
| 6,517,021 B2 | * | 2/2003 | Ikuta ........................... | 242/247 |
| 7,163,167 B2 | * | 1/2007 | Ikuta et al. .................. | 242/247 |
| 2002/0027176 A1 | * | 3/2002 | Ikuta ........................... | 242/247 |
| 2006/0231366 A1 | * | 10/2006 | Meggiolan .................. | 192/64 |
| 2009/0277984 A1 | * | 11/2009 | Wee et al. ................... | 242/257 |

FOREIGN PATENT DOCUMENTS
KR 20-1999-0039082 11/1999
* cited by examiner

*Primary Examiner* — Emmanuel M Marcelo
(74) *Attorney, Agent, or Firm* — Cantor Colburn LLP

(57) ABSTRACT

The present invention provides a clutch of a bait reel for fishing which controls rotation of a spool such that only when the handle is rotated to reel in a fishing line can one-way rotation of the spool be restricted. The clutch includes a ratchet wheel which is coupled to a rotating shaft of a handle, and a ratchet pawl which is provided in a reel frame. The ratchet pawl is removably locked to gear teeth of the ratchet wheel to control the rotation of the spool. A separate contact piece made of rigid material is coupled to a contact end of the ratchet pawl. Therefore, the contact piece directly receives a load and frictional resistance occurring when the gear teeth of the ratchet wheel presses the ratchet pawl. Thus, the ratchet pawl which is made of comparatively soft material to facilitate the operation of forming the ratchet pawl can be prevented from being easily damaged.

2 Claims, 5 Drawing Sheets

CLUTCH OF BAIT REEL FOR FISHING

BACKGROUND OF THE INVENTION

1. Field of the Invention

The present invention relates generally to clutches of bait reels for fishing and, more particularly, to a clutch of a bait reel in which a separate contact piece made of rigid material is coupled to a contact end of a ratchet pawl coming into contact with gear teeth of a ratchet wheel, so that the contact piece directly receives a load and frictional resistance occurring when the gear teeth of the ratchet wheel press the ratchet pawl by rotating a handle of the bait reel, thus preventing the ratchet pawl, which is made of comparatively soft material to facilitate the operation of forming the ratchet pawl, from being easily damaged.

2. Description of the Related Art

Generally, bait reels used in lure fishing include a reel frame, a spool, a handle and a side cover. The spool is rotatably mounted to the reel frame. A fishing line is wound around the spool. The handle is provided on one side of the reel frame to rotate the spool. The side cover is coupled to the other side of the reel frame.

Furthermore, a clutch which controls rotation of the spool and a clutch-operation control mechanism which controls the operation of the clutch are installed in the reel frame.

A representative conventional technique (hereinafter, referred to as "a prior art") pertaining to the clutch-operation control mechanism was proposed in Korean Utility Model Registration No. 0191968 (date: May 31, 2000) which was filed by Banax Co., LTD. and entitled "Clutch for bait cast reel".

The clutch of the prior art includes a ratchet wheel which is fastened to a rotating shaft of a handle, a clutch cam which is converted between a clutch-ON state and a clutch-OFF state depending on manipulation of a thumb bar, and a ratchet pawl which integrally extends from the clutch cam. The ratchet pawl is locked to or removed from gear teeth formed around the circumferential outer surface of the ratchet wheel depending on the operation of the clutch.

In the prior art, when a user pushes the thumb bar and converts the clutch into the clutch-OFF state, the ratchet pawl moves in conjunction with the thumb bar and is locked to the gear teeth of the ratchet wheel. In this state, when the user rotates the handle, the gear teeth of the ratchet wheel fastened to the rotating shaft of the handle push the ratchet pawl. At this time, a comparatively large load is applied to the surface of the ratchet pawl that comes into contact with the gear teeth of the ratchet wheel.

Typically, the ratchet wheel is formed by pressing a stainless steel plate, but the ratchet pawl is formed by molding zinc due to the complexity of the shape thereof. Because the strength of zinc is lower than that of stainless steel, the contact surface of the ratchet pawl may be easily damaged by pressure applied to the contact surface when the ratchet wheel pushes the ratchet pawl.

SUMMARY OF THE INVENTION

Accordingly, the present invention has been made keeping in mind the above problems occurring in the prior art, and an object of the present invention is to provide a clutch of a bait reel in which a separate contact piece made of rigid material is coupled to a contact end of a ratchet pawl coming into contact with the gear teeth of a ratchet wheel, so that the contact piece directly receives a load and frictional resistance occurring when the gear teeth of the ratchet wheel presses the ratchet pawl by rotating a handle of the bait reel, thus preventing the ratchet pawl, which is made of comparatively soft material to facilitate the operation of forming the ratchet pawl, from being easily damaged.

Another object of the present invention is to provide a clutch of a bait reel in which the contact piece has an insert part which is coupled to the ratchet pawl in an insert coupling manner, thus facilitating the assembly.

A further object of the present invention is to provide a clutch of a bait reel in which an adhesive injection hole is formed in the ratchet pawl to supply an adhesive to the insert part of the contact piece, so that the adhesive can be neatly applied to the junction between the contact piece and the ratchet pawl to enhance the coupling force therebetween, thus avoiding a post-process which may be required when adhesive is applied to an incorrect portion when the adhesive is applied to the junction between the contact piece and the ratchet pawl.

Yet another object of the present invention is to provide a clutch of a bait reel in which a rounded portion is formed on the side of the frictional part that is in contact with the ratchet pawl, thus increasing an area of contact between the ratchet pawl and the frictional part of the contact piece which comes into direct contact with the ratchet wheel and directly receives a load from the ratchet wheel, thereby more effectively coping with the friction and the impact.

In order to accomplish the above object, the present invention provides a clutch of a bait reel for fishing, including: a ratchet wheel fastened to a rotating shaft of a handle, with gear teeth provided on a circumferential outer surface of the ratchet wheel; and a ratchet pawl slidably provided in a reel frame of the bait reel. The ratchet pawl is selectively locked to or removed from the gear teeth of the ratchet wheel to control rotation of a spool. A contact piece is provided on a contact end of the ratchet pawl. The contact piece comes into contact with the gear teeth of the ratchet wheel when the ratchet pawl is locked to the gear teeth, thus sustaining a pressure with which the ratchet wheel pushes the ratchet pawl.

The contact piece may include a frictional part coming into contact with the gear teeth of the ratchet wheel, and an insert part coupled to the ratchet pawl in an insert coupling manner. The insert part may be integrated with the frictional part into a single body.

Furthermore, an adhesive injection hole may be formed in the ratchet pawl so that an adhesive is supplied to the insert part of the contact piece through the adhesive injection hole.

In addition, a rounded portion may be formed on a side of the frictional part of the contact piece adjacent to the ratchet pawl to increase an area of contact between the contact piece and the ratchet pawl.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
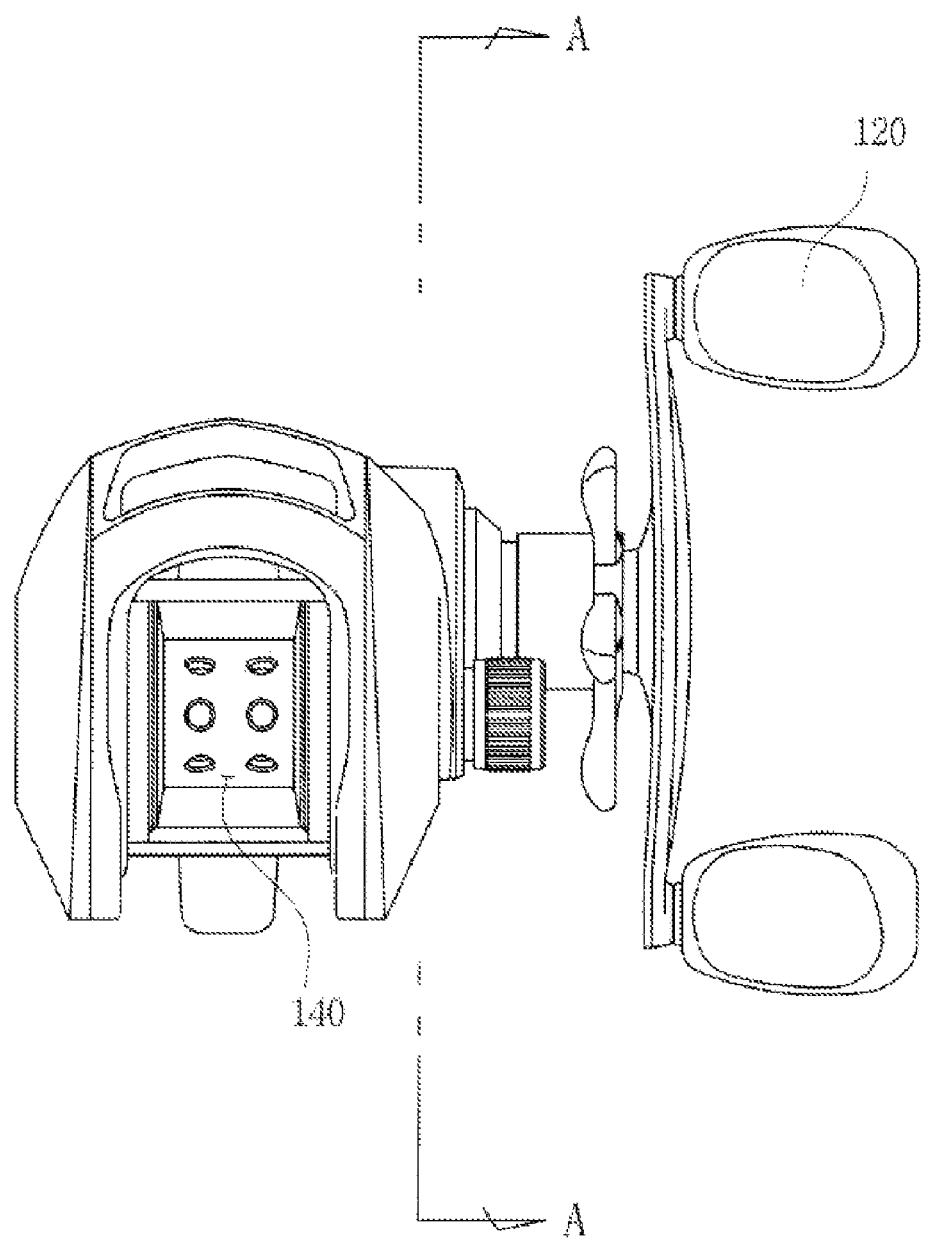
FIG. 1 is a view showing a bait reel for fishing, according to the present invention.

The invention now will be described more fully hereinafter with reference to the accompanying drawings, in which various embodiments or aspects are shown. This invention may, however, be embodied in many different forms, and should not be construed as limited to the embodiments set forth herein. Rather, all changes that fall within the bounds of the present invention, or the equivalence of the bounds are therefore intended to embraced by the present invention.

The same reference numerals throughout the drawings, that is, the same reference numerals for the second digit or the first digit, or for the second digit, the first digit and an alphabet character, denote elements having the same function. If not specifically mentioned otherwise, the elements denoted by the reference numerals are to be assumed to comply with the above-mentioned reference scheme.

In the drawings, the thicknesses of lines or the sizes of elements may be exaggerated or simplified to more clearly and conveniently illustrate the present invention, but the bounds of the present invention must not be interpreted as being limited thereto.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention provides a clutch of a bait reel for fishing which controls rotation of a spool such that when casting, the rotation of the spool is not restricted and only when the handle is rotated to reel in a fishing line can the one-way rotation of the spool be restricted.

The clutch of the present invention includes a ratchet wheel which is coupled to a rotating shaft of a handle, and a ratchet pawl which is provided in a reel frame. The ratchet pawl is moved by pushing a thumb bar along a slide slot formed in the reel frame and thus locked to the gear teeth of the ratchet wheel to control the rotation of the spool.

In the present invention, a separate contact piece made of rigid material is coupled to a contact end of the ratchet pawl coming into contact with the gear teeth of the ratchet wheel, so that the contact piece directly receives a load and frictional resistance occurring when the gear teeth of the ratchet wheel presses the ratchet pawl by rotating the handle of the bait reel. Thus, the ratchet pawl which is made of comparatively soft material to facilitate the operation of forming the ratchet pawl can be prevented from being easily damaged.

Figure 2:
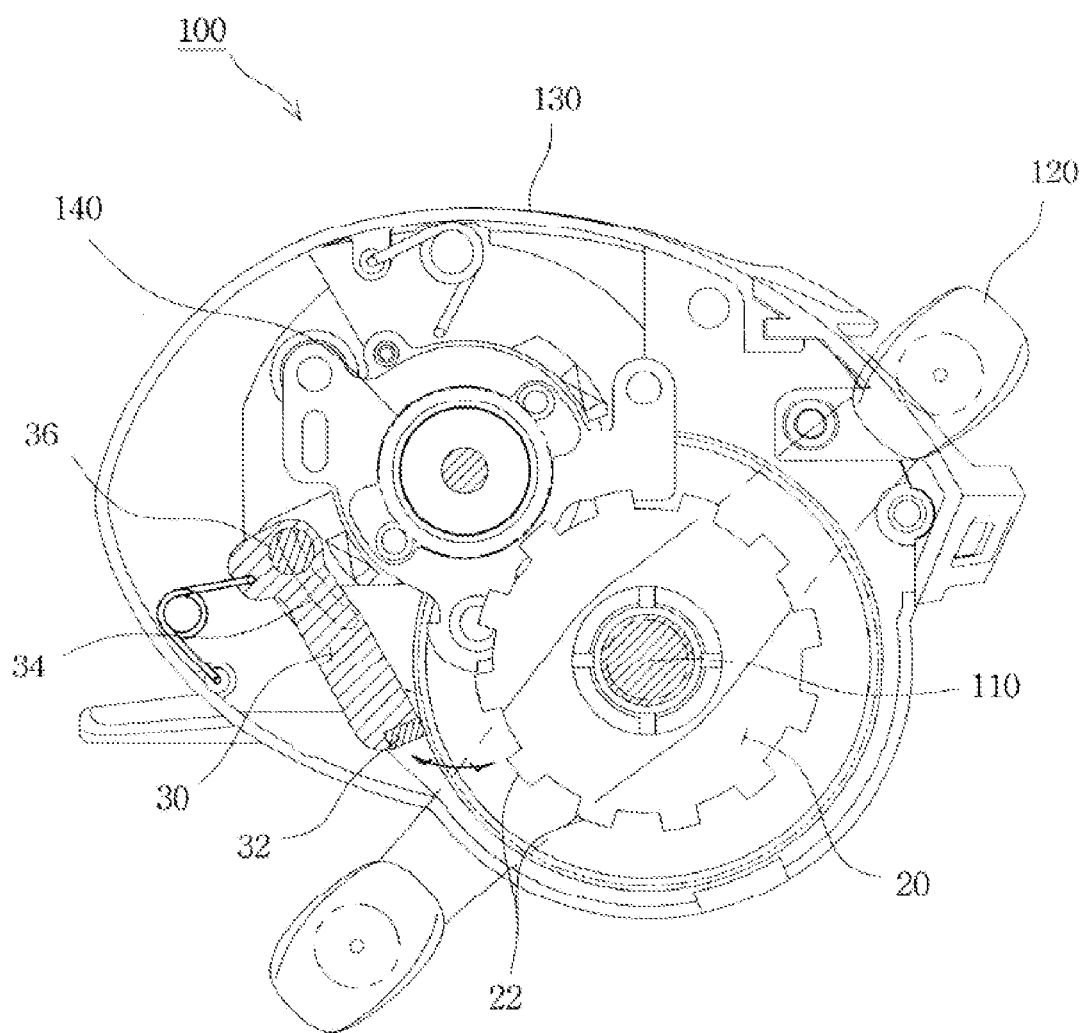
FIG. 2 is a sectional view taken along line A-A of FIG. 1 to illustrate a clutch-ON state of a clutch of the bait reel.
Figure 3:
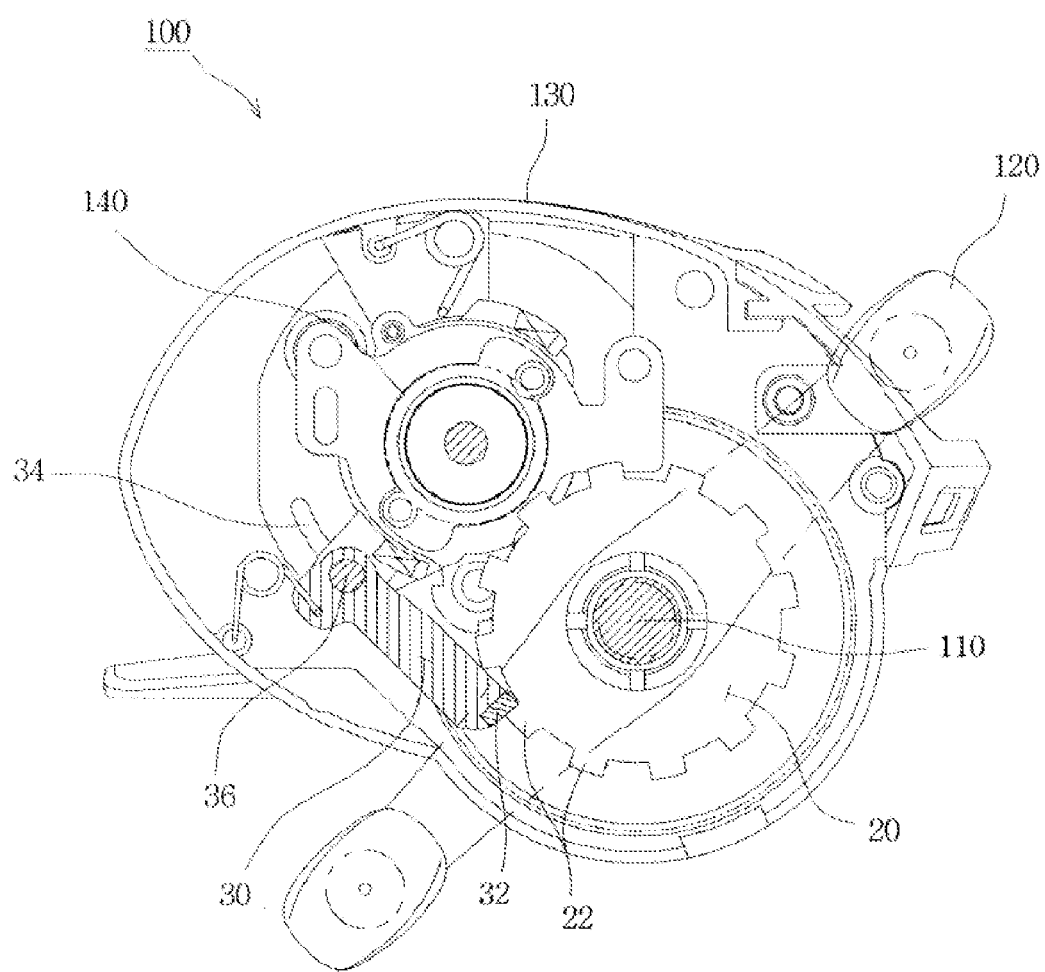
FIG. 3 is a sectional view corresponding to FIG. 2, but illustrating a clutch-OFF state of the clutch of the bait reel.

As shown in FIGS. 1 through 3, a clutch of a bait reel 100 for fishing according to the present invention controls a rotation rate of a spool 140 around which a fishing line is wound.

In detail, FIG. 2 is a sectional view taken along line A-A of FIG. 1 to illustrate a clutch-ON state of the clutch of the bait reel 100. As shown in FIG. 2, when the clutch is in the clutch-ON state (in other words, when a ratchet pawl 30 is in a state in which it is separated from gear teeth 22 of a ratchet wheel 20), the rotation of the spool 140 is not restricted, so that the spool 140 can freely rotate when casting.

In contrast, as shown in FIG. 3, when the clutch is in a clutch-OFF state (in other words, when the ratchet pawl 30 is in a state in which it is locked to the gear teeth 22 of the ratchet wheel 20), the rotation of the spool 140 is controlled such that only when a handle 120 rotates can the spool rotate.

The clutch includes the ratchet wheel 20 and the ratchet pawl 30 which are installed in a reel frame 130 of the bait reel.

The ratchet wheel 20 has a disk shape and is fastened to a handle rotating shaft 110 of the bait reel 100. The gear teeth 22 (in addition to having the shape shown in the drawings, they may comprise wedge-shaped teeth as that of the typical ratchet wheel to restrict backward rotation while allowing rotation in the normal direction) are provided around the circumferential outer surface of the ratchet wheel 20 so that the ratchet pawl 30 is releasably locked to the gear teeth 22.

The ratchet wheel 20 is formed by pressing a stainless steel plate to provide high strength and superior corrosion resistance.

The ratchet pawl 30 is slidably coupled, by a pin 36, to a slide slot 34 which is formed through the reel frame 130. The ratchet pawl 30 is moved along the slide slot 34 in a predetermined direction by pushing the thumb bar (not shown) and thus locked to or removed from the gear teeth 22 which are provided on the circumferential outer surface of the ratchet wheel 20.

The slide slot 34 and the pin 36 function to form a track of movement of the ratchet pawl 30. Various rail means can substitute the slide slot 34 and the pin 36, and the bounds of the present invention must not be interpreted as being limited to the rail means illustrated in the drawings.

It is desirable that the ratchet pawl 30 be formed by molding zinc or a zinc alloy in consideration of the complexity of the structure of the ratchet pawl 30. In the case of a zinc alloy or other various alloys (e.g., aluminum alloy), the weight of the product can be reduced and the sufficient strength can be provided.

When casting, the clutch of the bait reel of the present invention is maintained in the clutch-ON state such that the ratchet pawl 30 is removed from the gear teeth 22 of the ratchet wheel 20 to allow the spool 140 to rotate, as shown in FIG. 2.

As shown in FIG. 3, to convert the state of the clutch into the clutch-OFF state, the thumb bar is pushed in a predetermined direction. Thereby, the ratchet pawl 30 slides along the slide slot 34 and is then locked to the gear teeth 22 provided around the circumferential outer surface of the ratchet wheel 20.

In this state, when the handle 120 is rotated in an allowed direction, the gear teeth 22 of the ratchet wheel 20 fitted over the handle rotating shaft 110 push the ratchet pawl 30 outwards in a radial direction of the ratchet wheel 20 and thus pass over the ratchet pawl 30, so that the spool 140 can rotate only in one direction but be restricted from rotating in the reverse direction.

Meanwhile, a contact piece 32 made of rigid material is coupled to a contact end of the ratchet pawl 30. When the ratchet pawl 30 is locked to the gear teeth 22 of the ratchet wheel 20, the contact piece 32 comes into direct contact with the gear teeth 22 and thus directly receives a load and frictional resistance occurring when the gear teeth 22 of the ratchet wheel 20 presses the ratchet pawl 30. Thereby, the ratchet pawl 30 which is made of comparatively soft material to facilitate the operation of forming the ratchet pawl 30 can be prevented from being easily damaged.

It is desirable that the contact piece 32 be made of stainless steel to provide comparatively high strength and superior corrosion resistance in the same manner as that of the ratchet wheel 20.

Figure 4A:
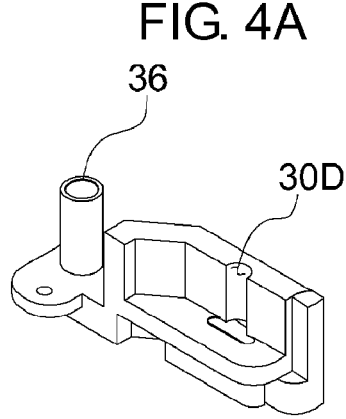
FIGS. 4A and 4B illustrate another embodiment of a ratchet pawl 30 and a contact piece.
Figure 4A:
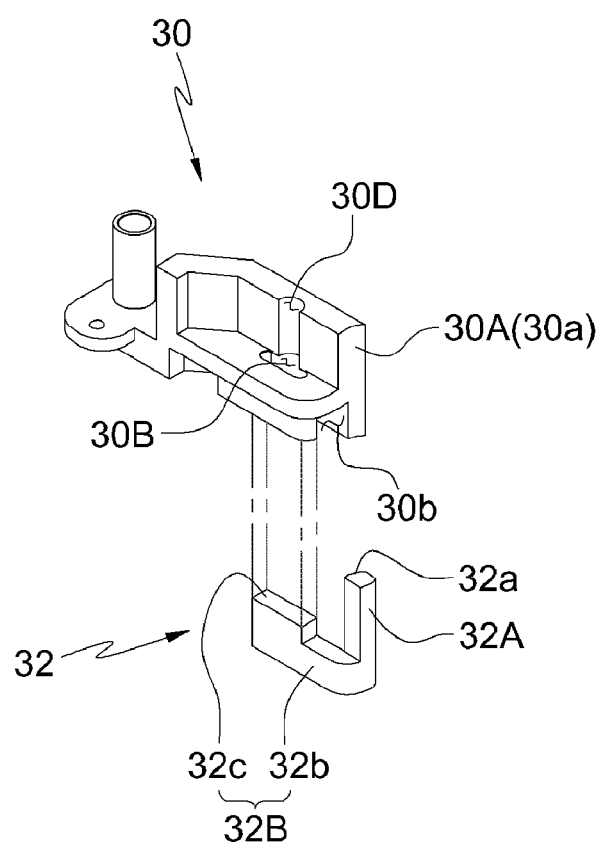
Figure 4A:
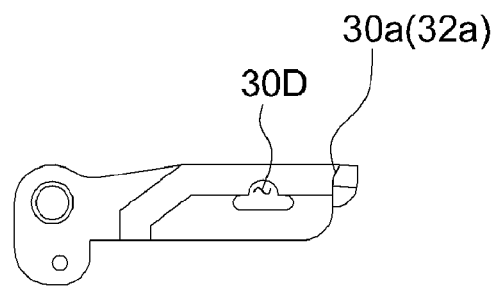
Figure 4B:
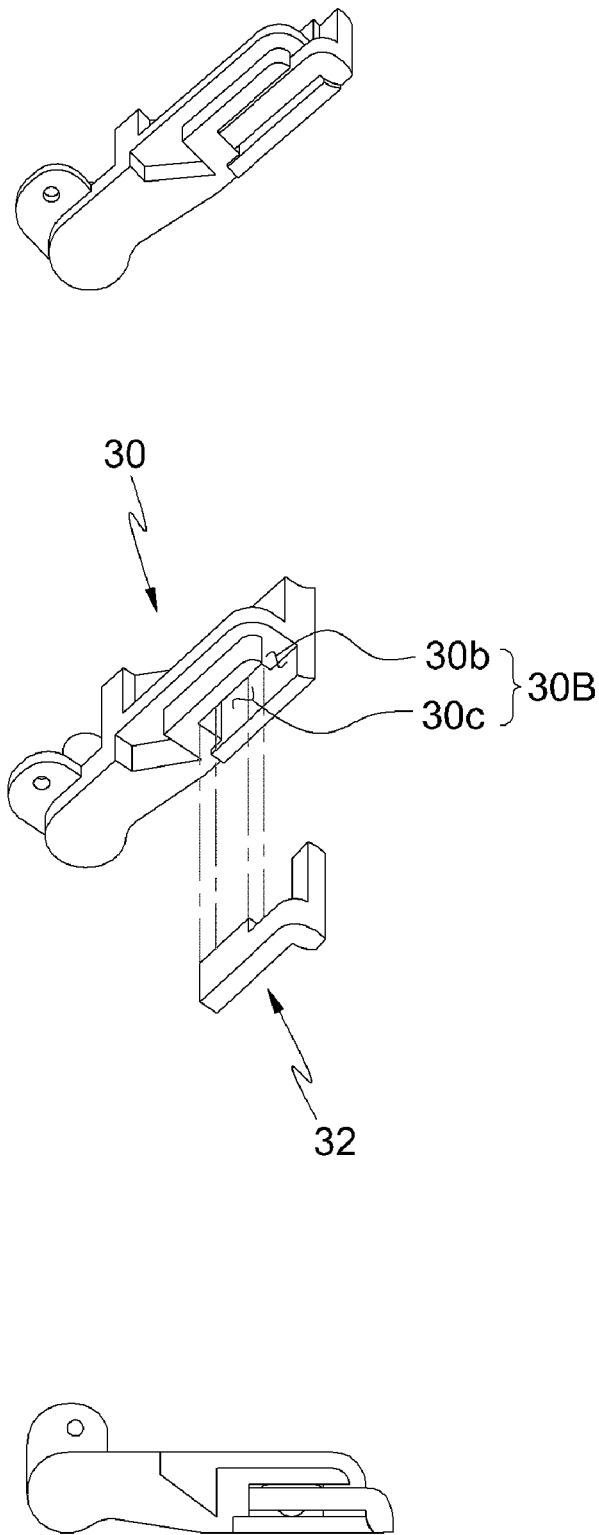

FIGS. 4A and 4B illustrate another embodiment of a ratchet pawl 30 and a contact piece 32.

FIG. 4A is of an assembled top perspective view, an exploded top perspective view and a plan view (in a positional sequence from the top to the bottom of the drawing) of the ratchet pawl 30 and the contact piece 32.

FIG. 4B is of an assembled bottom perspective view, an exploded bottom perspective view and a bottom view of the ratchet pawl 30 and the contact piece 32.

The contact piece 32 includes a frictional part 32A which comes into contact with the gear teeth 22 of the ratchet wheel 20, and an insert part 32B which is coupled to the ratchet pawl in an insert coupling manner.

The frictional part 32A and the insert part 32B are integrated together into a single body.

The contact piece 32 has an approximately 'L' shape. The frictional part 32A of the contact piece 32 has a structure and size appropriate to cover a contact end 30A of the ratchet pawl 30.

In detail, the insert part 32B includes a connection portion 32$b$ and a stop portion 32$c$.

An insert depression 30B having a shape corresponding to the structure of the contact piece 32 is formed in the ratchet pawl 30 at a position adjacent to the contact end 30A.

The insert depression 30B has an open space 30$b$ into which the connection portion 32$b$ of the contact piece 32 is seated, and a stop space 30$c$ into which the stop portion 32$c$ of the contact piece 32 is inserted.

Furthermore, due to characteristics of the material of the ratchet pawl 30 and the contact piece 32, it is desirable that the contact piece 32 be securely coupled to the ratchet pawl 30 using an adhesive rather than only by force-fitting.

Here, a post-process which may be required when adhesive is applied onto an incorrect portion must be avoided to increase the productivity and reduce the production cost.

To achieve the above-mentioned purpose, an adhesive injection hole 30D is formed in the ratchet pawl 30. The adhesive injection hole 30D communicates with the stop space 30$c$ so that adhesive can be supplied to the insert part 32B of the contact piece 32 through the adhesive injection hole 30D. As such, the adhesive injection hole 30D makes it possible to inject adhesive neatly.

Furthermore, in order to increase an area of contact between the contact piece 32 and the ratchet pawl 30$a$, a rounded portion 32$a$ is formed on a corresponding side of the frictional part 32A of the contact piece 32. A rounded recess 30$a$ corresponding to the rounded portion 32$a$ is formed in the contact end 30A of the ratchet pawl 30.

Because the rounded junction surfaces are formed by the rounded portion 32$a$ and the rounded recess 30$a$, impact and pressure applied to the ratchet pawl 30 when coming into contact with the gear teeth 22 of the ratchet wheel 20 can be evenly dispersed rather than being focused on a special portion of the contact end 30A of the ratchet pawl 30. Therefore, the ratchet pawl 30 can be more effectively protected from friction and impact generated between ratchet pawl 30 and the contact piece 32. In addition, the area of friction between ratchet pawl 30 and the contact piece 32 can increase, so that the ratchet pawl 30 can more effectively cope with the friction and the impact.

The operation of controlling the clutch of the bait reel according to the present invention will be described with reference to FIGS. 2 and 3.

As shown in FIG. 2, when casting, the clutch must be in the clutch-ON state. In this state, because the ratchet pawl 30 is maintained the state in which it is removed from the gear teeth 22 of the ratchet wheel 20, the spool 140 can rotate without restriction.

To reel in the fishing line using the handle 120, the spool 140 must be rotated only in one direction. For this, as shown in FIG. 3, the thumb bar is pushed to move the ratchet pawl 30 towards the ratchet wheel 20 along the slide slot 34 of the reel frame 130. Then, the ratchet pawl 30 is locked to the gear teeth 22 of the ratchet wheel 20. From this state, when rotating the handle 120 in the allowed direction, the gear teeth 22 of the ratchet wheel 20 coupled to the handle rotating shaft 110 push the ratchet pawl 30 outwards in a radial direction of the ratchet wheel 20 and thus pass over the ratchet pawl 30, so that the spool 140 can rotate only in one allowed direction but be restricted from rotating in the reverse direction.

When the gear teeth 22 of the ratchet wheel 20 pushes the ratchet pawl 30 by the rotation of the handle 120, the contact piece 32 of the ratchet pawl 30 which comes into direct contact with the gear teeth 22 directly receives a load and frictional resistance occurring when the gear teeth 22 press the ratchet pawl 30. Therefore, the ratchet pawl 30, which is made of comparatively soft material to facilitate the operation of forming the ratchet pawl 30, can be prevented from being easily damaged.

As described above, in a clutch of a bait reel according to the present invention, a separate contact piece made of rigid material is coupled to a contact end of a ratchet pawl coming into contact with gear teeth of a ratchet wheel. Thus, the contact piece directly receives a load and frictional resistance occurring when the gear teeth of the ratchet wheel presses the ratchet pawl by rotating a handle of the bait reel. Thereby, the contact piece can prevent the ratchet pawl, which is made of comparatively soft material to facilitate the operation of forming the ratchet pawl, from being easily damaged.

Furthermore, the contact piece has an insert part which is coupled to the ratchet pawl in an insert coupling manner, thus facilitating the assembly.

In addition, an adhesive injection hole is formed in the ratchet pawl to supply an adhesive to the insert part of the contact piece. Therefore, the adhesive can be neatly applied to the junction between the contact piece and the ratchet pawl to enhance the coupling force therebetween. Thus, the present invention can avoid a post-process which may be required when adhesive is applied onto an incorrect portion when the adhesive is applied to the junction between the contact piece and the ratchet pawl.

Moreover, a rounded portion is formed on the side of the frictional part that is in contact with the ratchet pawl. Accordingly, an area of contact between the ratchet pawl and the frictional part of the contact piece which comes into direct contact with the ratchet wheel and directly receives a load from the ratchet wheel can be increased, thus coping with the friction and the impact more effectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A clutch of a bait reel for fishing, comprising:
   a ratchet wheel fastened to a rotating shaft of a handle, with gear teeth provided on a circumferential outer surface of the ratchet wheel; and
   a ratchet pawl slidably provided in a reel frame of the bait reel, the ratchet pawl being selectively locked to or removed from the gear teeth of the ratchet wheel to control rotation of a spool, with a contact piece provided on a contact end of the ratchet pawl, the contact piece coming into contact with the gear teeth of the ratchet wheel when the ratchet pawl is locked to the gear teeth, thus sustaining a pressure with which the ratchet wheel pushes the ratchet pawl,
   wherein the contact piece comprises: a frictional part coming into contact with the gear teeth of the ratchet wheel, the frictional part covering a contact end of the ratchet pawl; and an insert part comprising a connection portion and a stop portion, the insert part being coupled to the ratchet pawl in an insert coupling manner and integrated with the frictional part into a single body, and
   the ratchet pawl has: an insert depression comprising an open space into which the connection portion of the contact piece is seated, and a stop space into which the stop portion of the contact piece is inserted; and an adhesive injection hole communicating with the stop space of the contact piece so that an adhesive is supplied to the insert part of the contact piece through the adhesive injection hole.

2. The clutch as set forth in claim 1, wherein a rounded portion is formed on a side of the frictional part of the contact piece adjacent to the ratchet pawl to increase an area of contact between the contact piece and the ratchet pawl, the rounded portion corresponding to a rounded recess formed in the contact end of the ratchet pawl.

* * * * *